Sept. 17, 1963 J. A. HJULIAN Re. 25,447

AERATOR DEVICE

Original Filed Feb. 10, 1953 2 Sheets-Sheet 1

Inventor.
Julius A. Hjulian.
By Joseph O. Lange Atty.

AERATOR DEVICE
Original Filed Feb. 10, 1953 2 Sheets-Sheet 2
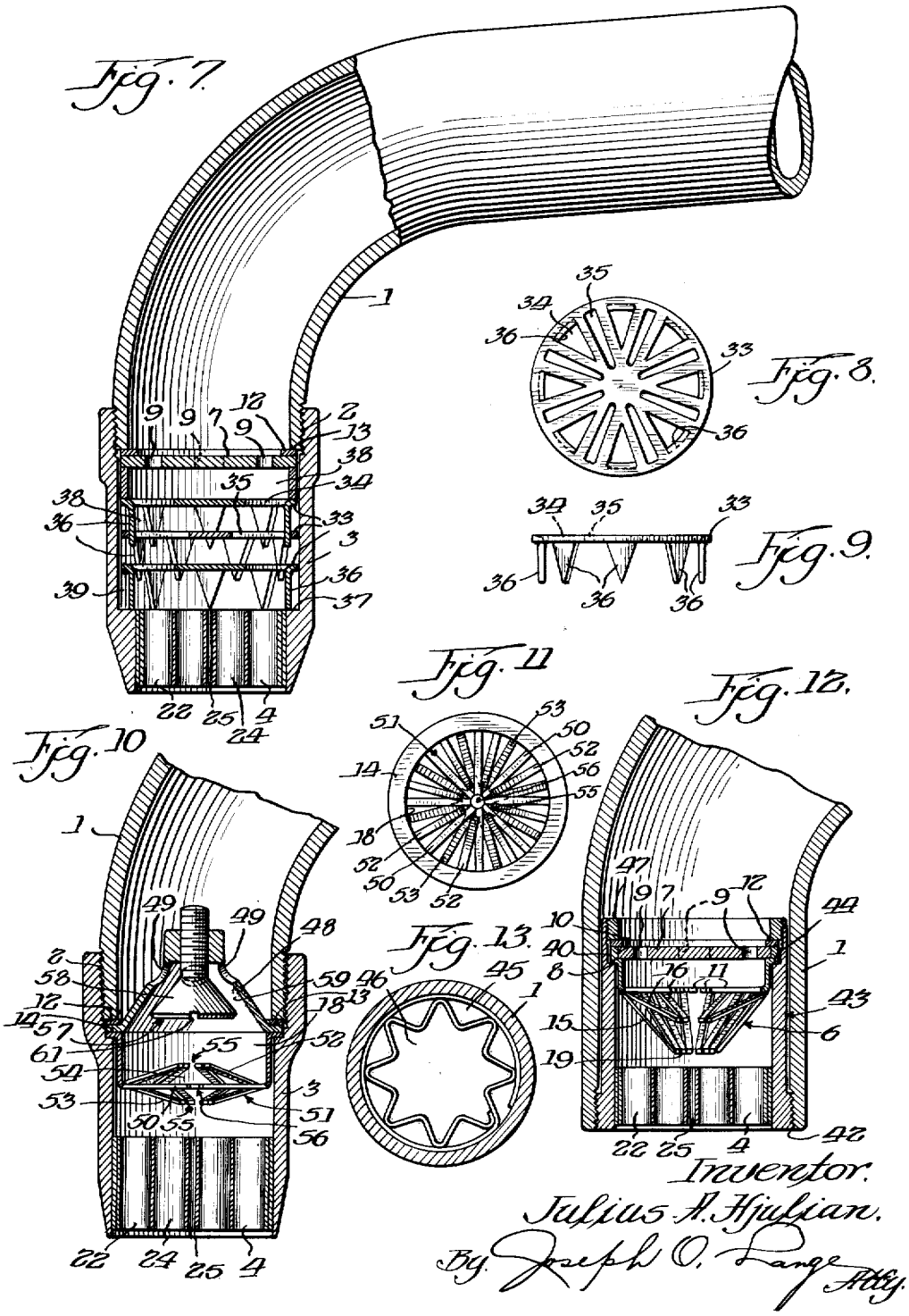

United States Patent Office

Re. 25,447

Reissued Sept. 17, 1963

25,447

AERATOR DEVICE

Julius A. Hjulian, Palos Heights, Ill., assignor, by mesne assignments, to Elie P. Aghnides, New York, N.Y.

Original No. 2,754,097, dated July 10, 1956, Ser. No. 336,113, Feb. 10, 1953. Application for reissue Dec. 18, 1961, Ser. No. 166,731

8 Claims. (Cl. 239—424)

Matter enclosed in heavy brackets [ ] appears in the original patent but forms no part of this reissue specification; matter printed in italics indicates the additions made by reissue.

The invention relates to an aerator device and constitutes modifications and improvements over the subject matter covered in my pending patent application pertaining to similar devices and identified by Serial No. 333,577, filed January 27, 1953.

As brought out in the application identified by the above serial number, it has long been a problem to provide an aerator device such as that used to aerate water, for example, discharging from a kitchen sink faucet spout because of the prior uses of air inlet ports communicating with the atmosphere by transverse ported extension through the walls of the faucet spout or casing and frequently leading to the creation of an unsanitary condition at the spout discharge limits.

There has also been the strong objection that because of the earlier employment of screens superposed and positioned in transverse relation to the path of flow clogging eventually has resulted to render the device virtually useless for the purpose and, of course, seriously interfering with the desired capacity or volume of discharge from the faucet or other device upon which the aerator is installed.

Therefore, as in the case of my co-pending application, it is an important object of this invention to provide a novel aerating device in which both of the objectionable conditions above referred to are eliminated and in addition to provide an aerator which is relatively economical to manufacture, and which maintains itself in workable condition almost indefinitely and may be easily installed, inspected or removed as desired.

Other objects and advantages of this invention will become more readily apparent upon proceeding with a description of preferred forms as per the accompanying specification and read in light of the drawings, in which FIG. 1 is a fragmentary magnified assembly view of a preferred embodiment of the invention.

FIG. 7 is a fragmentary sectional view of a further modification.

FIG. 8 is a top plan view of one of the discs of FIG. 7.

FIG. 9 is a side elevation of the disc of FIG. 7.

FIG. 10 is a fragmentary sectional view of a further modification.

FIG. 11 is a plan view of the diffuser shown in FIG. 10.

FIG. 12 is a fragmentary sectional view of a further modification.

FIG. 13 is a plan view of a conventional form of flow guide.

Similar reference numerals refer to similar parts throughout the several views.

Figure 1:
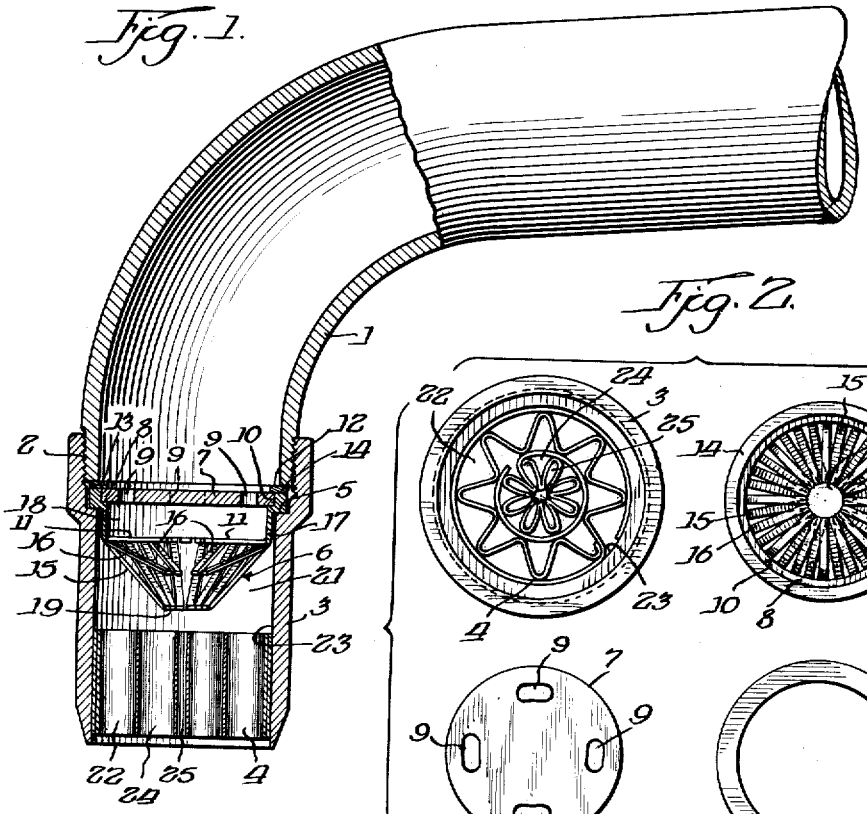

Referring now to FIG. 1, it should be noted that the aerator of this invention comprises essentially such parts as an imperforate conduit or spout 1, threadedly provided as at 2 to receive a body 3, which body is imperforate between the inlet and outlet thereof and which in combination with the spout 1 forms conduit means which is imperforate to the open outlet end of the body 3, the said body at the lower portion having a flow guide member 4, as illustrated. From a shoulder 5 therewithin a diffuser generally designated 6 is mounted. Diaphragm means preferably in the form of a relieved or apertured disc 7 is received within the bore 10. The disc rests upon shoulder 8, the apertures 9, annularly arranged, all combining to serve as passages for the flow of liquid therethrough in a manner as hereinafter described at greater length. At the end of the conduit, an annular gasket 12 is interposed so as to make a fluid tight seal between the end surface 13 of the conduit and the inner end surface 14 of the diffuser 6. It has been found that the diffuser member 6 should preferably be formed as a basket or cup-shaped receptor, and in the form herein disclosed, it will be noted, it assumes the general configuration throughout of being cup-shaped. Further, it will be noted that the diffuser has a series of ribs or fins 11, 15, and 16, preferably extending radially inward from the outer periphery of the diffuser portion 17 as illustrated. They are designated: those 11 are horizontal but 16 are bent at 22½° angle and 15 are bent at 45° angle. The general arrangement of such fins is more clearly shown with respect to their radial extension in FIG. 2, and while a number of the fins, such as 16, may extend in the plane indicated, they may, of course, be differently arranged and shaped, depending upon the service and the size of the member with which the aerator is associated. Therefore, it is a matter of choice as to the angle at which the ribs or fins 15 and 16 are bent toward the center and the staggered pattern of generally frustoconical form may therefore vary quite substantially from that illustrated without detracting from the function of such arrangement.

Similarly, as to the apertures 9 in the disc 7, while shown as small rectangular or arcuate orifices annularly disposed for discharging fine streams of water at high velocity into the diffuser strainer, these forms also may change. However, it should be understood that by the intensive and high velocity flow of water through the above described orifices 9 and subsequently through spaces between the fins 11, 15, and 16 at relatively high velocity it has been found that much turbulence takes place within the chamber 18 realizing that the stream jets passing through the orifices 9 will strike and impinge upon the fins 11, 15, and 16 immediately therebelow, as shown. The diffuser at its lower end portion is preferably, but not necessarily, provided by shape and length of fins 11, 15 and 16 with a central aperture 19. In connection with the turbulence referred to, a vacuum-like condition appears to be created within and about the chamber 18 to the extent of requiring an air replacement therewithin at the locations referred to and this is effected by a counterflow of air apparently induced by the vacuum-like condition within the chamber 18 and perhaps to some extent existing within the chamber 21 below. In addition, the flow of the stream beyond the central aperture 19 aids in creating the aspiratory effect insofar as the draw of air from the outside is concerned. It has been found, for example, that apperently the air is drawn in from the outside and by reason of the cellular construction 22 formed by the flow guide member 4, preferably but not necessarily, used, a unique flow pattern is provided in which the discharging stream largely formed at the central aperture 19 causes the drawing in of air at peripheral points and in some cases annularly around the wall surface 23. The cellular construction 22 may be supplemented by continuing the wire formation, as more clearly shown in FIG. 2, to include cells extending across the opening as at 24 and 25. In the structure shown, the flow guide substantially extends across the discharging aperture of the chamber formed by the wall 23 to aid in giving greater stratification of the discharging stream, which preferably is a continuous soft coherent flow.

Figure 2:
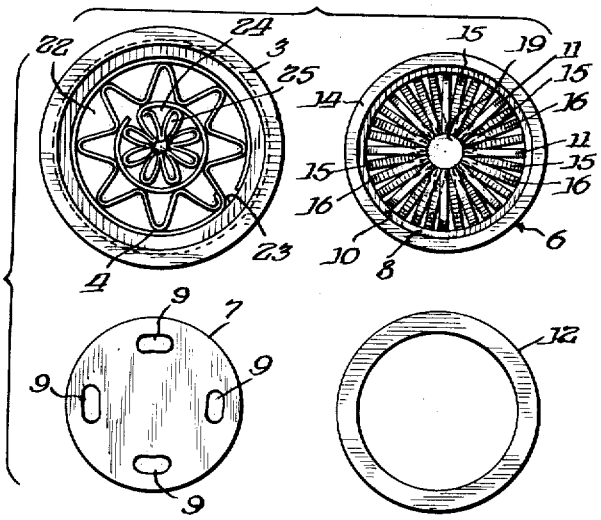
FIG. 2 shows exploded plan views of the elements combining to form the invention.
Figure 3:
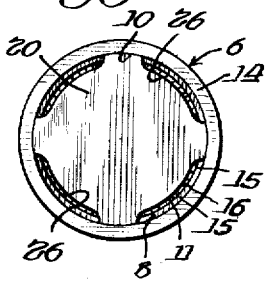
FIG. 3 is a plan view of a modified form of disc mounted on the same diffuser as shown in FIGS. 1 and 2.

In some cases, as shown more clearly in FIG. 3, the disc member or diaphragm 20 may be made with relieved notches of greater arcuate dimensions as shown at 26 to direct flow downwardly from an annular position. In all other respects, the structure may be similar to that shown in FIGS. 1 and 2.

Figure 4:
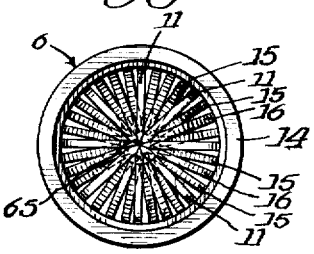
FIG. 4 is a plan view of a modified form of diffuser.

FIG. 4 is same as FIG. 2, except the central aperture 19 is eliminated by extended fins 11 to the center to close the passage, and each fin 11 is stake-pointed to form an unbroken or closed center.

Figure 5:
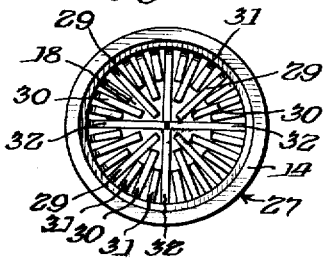
FIG. 5 is a plan view of a still further modified form of diffuser.
Figure 6:
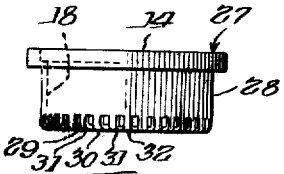
FIG. 6 shows a side view of the structure referred to in FIG. 5.

In FIGS. 5 and 6, a diffuser, such as 27, may be of substantially depending cylindrical form, such as 28, and provided with the radially extending fins of variable length and angle, such as at 29, 30, and 31, the longest prongs being 32, next longest 29, next 30 and short prongs 31. Similarly, a solid center is again formed, the fins extending diametrically across as shown. The discs shown in FIGS. 2 or 3 may also be used with this form of diffuser without inconvenience although a disc is not absolutely essential. The diffuser 27 is supported in the manner described in connection with FIG. 1. In this structure, it has been found that because the angles of the radially extending fins 29 through 32 are not so pronounced as that described in connection with FIGS. 1 and 2, there may be even greater turbulence within the chamber 18 thereabove. The form of flow guide used may be similar to that shown in FIGS. 1 and 2 or in some cases here, too, it may be dispensed with.

In FIG. 7, another modification of a diffuser is shown in which the conduit or spout discharge 1 is supplied with an aerator body 3, similarly attached as at 2 by means of the threads or other suitable arrangement and the gasket 12 as well as the apertured disc 7 is assembled therewith as shown. However, in this modified construction, a plurality of superposed diffuser members, as shown more clearly in FIGS. 8 and 9 and designated generally 33, have spaced openings 34 and 35 and lower depending fingers 36 adapted to be received at their lowermost installation or support upon the shoulder 37 of the body 3. The fingers of the remaining superposed portions are received within the relieved portions 35 as shown to form a nest of diffusers, to provide for the turbulence within the chamber 38 as well as within the annular spaces 39.

While a flow guide 4 is shown in combination therewith, it will be understood that under certain conditions it may be dispensed with.

In FIG. 10, a further modified form is shown in which the diffuser is shoulder mounted on the body 3 on the surface 14 thereof, as shown, and the diaphragm or flow interrupting member 48 preferably assumes a frustoconical form provided with the annularly arranged apertures 49. It is held in clamped relation with the conduit 1 by means of the threads 2 employing the gasket 12 generally bearing against surface 13 in the same manner as described in FIGS. 1 and 2. The diffuser 51 is provided with radially extending fin portions 50, 52 and 53 extending so as to form a chamber 54 and an upper and lower aperture 55 and intermediate aperture formed at 56. The usual flow guide 4 may be used or dispensed with as desired. An additional feature of this construction lies in the ability to control the volume of the water passing through the apertures 49 by means of the threaded conical diverter member 57 having the head 58 of frustoconical form so as to merge closely with and form the annular chamber 59 as illustrated. Thus, it will be clear that by the mere insertion of a small screw driver engaging the slot 61 of the head 57 and rotating the latter as desired, the space 59 may be adjusted accordingly. Here, it will be apparent a simple and effective means for throttling the flow into the diffuser chamber 18 is thus relatively easily accomplished.

FIG. 11 is top plan view of diffuser of FIG. 10.

In FIG. 12, an additional modified form is shown in which the only variation from that shown in FIG. 1 is that instead of having the conduit 1 threaded with outside exposed threads, it is internally threaded as at 42 to receive the body generally designated 43, the latter member at 44 being shouldered to receive the diffuser 6 following the details of FIGS. 1 and 2. The flow guide in this form may differ from that of FIG. 1 in that it is preferably of a form provided with the cells 45 and does not extend across the full opening as indicated beyond chamber 46 in FIG. 13. The arrangement of the fins on the diffuser 6 is similar to that of FIG. 1. The gasket 12 is clamped in fluid sealing relation against the disc 7 by means of the threaded bushing 47.

While several embodiments have been described herein, of course, it should be clear that a number of other structures falling within the terms of the invention may be suitably provided, and therefore, the spirit of the invention should be measured by the scope of the appended claims.

I claim:

1. An aerator combination or the like comprising conduit means having an open end, means extending across the path of liquid flow through said conduit means, said extending means including a multiplicity of transversely disposed elements adapted to diffuse and break up liquid flowing therepast into fine particles whereby to draw in fluid such as air from exterior to said conduit means upstream through said open end thereof for admixture with the liquid and effecting the production of an aerated stream flowing from said conduit means, said extending means having openings between adjacent elements, said openings extending longitudinally, said conduit means being substantially imperforate to the terminus of said open end of the same, said transversely disposed elements being substantially upstream from said open end of the conduit means, said latter elements being fixed relative to the conduit means and having annular support means cooperating with the latter means, said extending means including a diaphragm relieved limitedly for the passage of the liquid therepast in jet streams of substantial velocity, said diaphragm being positioned upstream from said transversely disposed elements whereby to direct the jet streams against said elements for the diffusion and breaking up of the same, *said extending means defining a chamber between the diaphragm and the transversely disposed elements which is closed to external sources of fluid except for the limited relief in the diaphragm and for openings between said elements, whereby a vacuum-like condition is created in and about the chamber inducing a counterflow of air from said open end of the conduit means.*

2. An aerator combination or the like comprising conduit means having an open end, diffuser means supported within said conduit means having a plurality of elements projecting transversely therefrom, diaphragm means positioned in spaced relation above said projecting elements, said diaphragm means being relieved for the passage of liquid therepast in jet streams of substantial velocity, the elements of said diffuser means being disposed and adapted to intercept the jet streams and break up the same into fine particles for admixture with fluid such as air drawn in through said open end of the conduit means for production of an aerated discharge stream therefrom, said diffuser means having openings between adjacent elements, said openings extending longitudinally, said elements extending from adjacent the inner periphery of the conduit means, the discharge open end of the conduit means being substantially the same size inside as the portion of the diffuser means having the elements and up at least as far as those elements to permit free introduction of air within said conduit means, said conduit means being substantially imperforate to the terminus of said open end of the same.]

3. An aerator combination or the like comprising conduit means having an open end, means within said conduit means comprising a diaphragm and diffuser means below said diaphragm, said diffuser means comprising transversely extending elements arranged substantially in tiers vertically spaced from each other at least towards the central portion thereof, said diaphragm being relieved for the passage of the liquid therepast in streams of substantially increased velocity and for impingement of the liquid with the diffuser means, and conduit means being substantially imperforate to the terminus of said open end of the same, said diaphragm and diffuser means being positioned substantially upstream from the said open end of the conduit means, said diffuser means having openings between adjacent elements of each tier, said openings extending longitudinally, the elements of one of the tiers being staggered relative to the elements of at least another tier.

4. An aerator combination or the like comprising conduit means having an open end, means within said conduit means comprising a diaphragm and diffuser means below said diaphragm, said diffuser means comprising a plurality of finger-like projections supported at only one end thereof, each of the finger-like projections being angularly disposed relative to each other, said diffuser means being open across the interior of the conduit means except for the finger-like projections, said diaphragm being relieved for the passage of the liquid therepast in jet streams of substantially increased velocity and for impingement of the liquid with the projections of the diffuser means, said conduit means being substantially imperforate to the terminus of said open end of the same, said diaphragm and diffuser means being upstream from said open end of the conduit means.

5. An aerator combination or the like comprising conduit means having an open end, a cup-shaped diffuser member supported within said conduit means, diaphragm means extending across an upper end portion of said diffuser member, said diaphragm means being relieved for the passage of liquid therepast in jet streams of substantial velocity, said diffuser member having a multiplicity of projecting elements adapted to diffuse and break up the liquid flow from said diaphragm means whereby to draw in fluid such as air from exterior to said conduit means upstream through said open end thereof for admixture with the liquid and production of an aerated stream flowing from said conduit means, each of said projecting elements being supported at only one end, said diffuser means being open across the interior of the conduit means except for the said elements, said latter conduit means being substantially imperforate to the terminus of said open end, the said projecting elements of the diffuser member being upstream relative to said open end of the conduit means.

6. An aerator combination or the like comprising conduit means having an open end, a cup-shaped diffuser member supported within said conduit means, said latter member being provided with a plurality of elements extending substantially radially from the side wall of said cup-shaped diffuser member, diaphragm means extending across an upper end portion of said diffuser member, said diaphragm means being relieved for the passage of liquid therepast in streams of relatively increased velocity, the elements of said diffuser member being disposed within the conduit so as to intercept the liquid flow from said diaphragm means and break up the liquid for admixture with fluid such as air drawn in through said open end of the conduit means for the production of an aerated discharge stream, the discharge open end of the conduit means being substantially the same size inside as the portion of the diffuser member having the said elements and up at least as far as those elements to permit free introduction of air within said conduit means, said conduit means being substantially imperforate to the terminus of said open end of the same.

7. An aerator combination or the like comprising conduit means having an open end, a diffuser member supported within said conduit means, said latter member being provided with a plurality of elongated elements extending inwardly from an annular portion thereof and supported only at the outer ends of the same, said latter elements being annularly disposed in diverse angles of inclination with respect to the direction of fluid discharge from said open end of the conduit means, transversely extending diaphragm means supported in spaced relation above said elongated elements of the diffuser member, said diaphragm means being suitably relieved for the passage of liquid therepast with substantially increased velocity, said elongated elements of the diffuser member being disposed and adapted to intercept the liquid flow from said diaphragm means and break up of the same into fine particles and mix it with fluid such as air drawn in exteriorly relative to said conduit means upstream through said open end thereof for the production of an intimately aerated discharge stream, said latter conduit means being substantially imperforate to the terminus of said open end thereof, said diaphragm means and the diffuser member being substantially upstream from said open end of the conduit means.

8. The subject matter of claim 7 including flow guide means annularly mounted below said diffuser member.

9. The subject matter of claim 7, said diffuser member having a central opening through said inwardly directed elements thereof for unrestricted fluid flow therethrough.

References Cited in the file of this patent or the original patent

UNITED STATES PATENTS

| | | |
|---|---|---|
| 1,590,059 | Reents et al. | June 22, 1926 |
| 2,065,161 | Thompson | Dec. 22, 1936 |
| 2,075,867 | Sampel | Apr. 6, 1937 |
| 2,298,755 | Diller | Oct. 13, 1942 |
| 2,395,621 | Funke | Feb. 26, 1946 |
| 2,541,854 | Bachli et al. | Feb. 13, 1951 |
| 2,558,238 | Collins | June 26, 1951 |
| 2,570,669 | Hannigan | Oct. 9, 1951 |
| 2,624,559 | Hyde | Jan. 6, 1953 |
| 2,633,343 | Aghnides | Mar. 31, 1953 |
| 2,643,104 | Holden | June 23, 1953 |

FOREIGN PATENTS

| | | |
|---|---|---|
| 6,012 of 1909 | Great Britain | Nov. 18, 1909 |
| 1,000,443 | France | Oct. 10, 1951 |